(12) United States Patent
Doss et al.

(10) Patent No.: US 6,751,109 B2
(45) Date of Patent: Jun. 15, 2004

(54) DUAL INPUT AC/DC/ BATTERY OPERATED POWER SUPPLY

(75) Inventors: Jeffery S. Doss, Scottsdale, AZ (US); Richard Garrison DuBose, Scottsdale, AZ (US); Alexei A. Piatetsky, Reichertsheim (DE); Gilbert MacDonald, Queen Creek, AZ (US); Charles Lord, Scottsdale, AZ (US); Scott Smith, Phoenix, AZ (US)

(73) Assignee: Mobility Electronics, Inc., Scottsdale, AZ (US)

( * ) Notice: Subject to any disclaimer, the term of this patent is extended or adjusted under 35 U.S.C. 154(b) by 61 days.

(21) Appl. No.: 10/159,910

(22) Filed: May 31, 2002

(65) Prior Publication Data

US 2003/0081439 A1 May 1, 2003

Related U.S. Application Data

(63) Continuation-in-part of application No. 10/005,961, filed on Dec. 3, 2001.
(60) Provisional application No. 60/335,785, filed on Oct. 31, 2001.

(51) Int. Cl.$^7$ ............................................... H02M 1/10
(52) U.S. Cl. ....................................... 363/142; 307/64
(58) Field of Search ........................... 363/37, 65, 142; 307/25, 26, 64, 65, 66, 80

(56) References Cited

U.S. PATENT DOCUMENTS

| | | |
|---|---|---|
| 1,741,265 A | 12/1929 | Wappler |
| 2,427,111 A | 9/1947 | Tolmie |
| 2,792,559 A | 5/1957 | Maberry |
| 3,201,617 A | 8/1965 | Pacoroni et al. |

(List continued on next page.)

OTHER PUBLICATIONS

Press Release of Empire Engineering, Electronic Design and Management, Jul. 5, 1995—San Luis Obispo, CA USA, pp 1–2.

Description of the "Smart Adapter System" NESCO Battery Systems, 1995; pp. 1–2.

Macworld, "On the Road", vol. 12, No. 7 Jul. 1995, pp 141–142, 5/9/1 (Item 1 from file: 15) DIALOG(R) File 15: ABI/INFORM(R).

Empire Engineering San Luis Obispo, CA; SmartCord Assembly and Schematic Drawing; Feb. 9, 1996 pp 1–3.

(List continued on next page.)

*Primary Examiner*—Adolf Berhane
(74) *Attorney, Agent, or Firm*—Jackson Walker LLP; Robert C. Klinger

(57) ABSTRACT

A dual input battery assisted power converter (10) which provides a continuous, regulated DC voltage output to a user-connected mobile device, such as, a lap top computer or a cell phone, for example. The power converter (10) comprises a power supply circuit (12) and a separate, detachable power storage circuit comprising a battery pack (14) having a re-chargeable battery (36). The power supply (12) is adapted to deliver a pair of regulated DC output voltages, of opposite voltage potentials, to a pair of respective output terminals. Preferably these output voltages are derived from two external input voltages: an AC input voltage and a DC input voltage. Advantageously, if both of the external input voltages are temporarily removed, the battery pack (14) will advantageously serve as a substitute DC input power source, thereby allowing the power supply (12) to deliver the same regulated DC output voltage to the user-connected mobile device without interruption. Moreover, once either of the external input voltages are again re-established, the battery pack (14) automatically taps the output terminal of the power supply (12) at a node to recharge the battery pack (14).

16 Claims, 2 Drawing Sheets

U.S. PATENT DOCUMENTS

| | | |
|---|---|---|
| 3,256,466 A | 6/1966 | Trolio et al. |
| 3,275,855 A | 9/1966 | Wright |
| 3,281,747 A | 10/1966 | Winsand |
| 3,452,215 A | 6/1969 | Alessio |
| 3,484,864 A | 12/1969 | Berstein et al. |
| 3,581,480 A | 6/1971 | O'Conner et al. |
| 3,784,956 A | 1/1974 | Gassman |
| 3,870,946 A | 3/1975 | Sandorf |
| 3,996,546 A | 12/1976 | Hugly |
| 4,089,041 A | 5/1978 | Lockard |
| 4,164,665 A | 8/1979 | Berger |
| 4,239,319 A | 12/1980 | Gladd et al. |
| 4,258,969 A | 3/1981 | Stallard |
| 4,622,627 A | 11/1986 | Rodriguez et al. |
| 4,713,642 A | 12/1987 | Wolfe et al. |
| 4,885,674 A | 12/1989 | Varga et al. |
| 4,890,214 A | 12/1989 | Yamamoto |
| 5,019,954 A | 5/1991 | Bourgeault et al. |
| 5,040,990 A | 8/1991 | Suman et al. |
| 5,044,964 A | 9/1991 | Minerd et al. |
| 5,092,788 A | 3/1992 | Pristupa, Jr. et al. |
| 5,181,859 A | 1/1993 | Foreman et al. |
| 5,290,191 A | 3/1994 | Foreman et al. |
| 5,347,211 A | 9/1994 | Jakubowski |
| 5,369,352 A | 11/1994 | Toepfer et al. |
| 5,412,248 A | 5/1995 | Murari et al. |
| 5,428,288 A | 6/1995 | Foreman et al. |
| 5,455,734 A | 10/1995 | Foreman et al. |
| 5,479,331 A | 12/1995 | Lenni |
| 5,636,110 A | 6/1997 | Lanni |
| D391,227 S | 2/1998 | Dickey |
| 5,770,895 A | 6/1998 | Kumasaka |
| 5,838,554 A | 11/1998 | Lanni |
| 5,886,422 A | 3/1999 | Mills |
| 5,949,213 A | 9/1999 | Lanni |
| 6,064,177 A | 5/2000 | Dixon |
| 6,091,611 A | 7/2000 | Lanni |
| 6,172,884 B1 | 1/2001 | Lanni |
| 6,297,972 B1 * | 10/2001 | Chen .......................... 363/37 |

OTHER PUBLICATIONS

Empire Engineering, "Universal DC Adapter for Portable Computer Power" Electronic Design and Management; Jan. 1995.

Press Release "New PowerXtenderoe Adapter Lets Portable Computer Users Plug into Computing Power on Airplanes and in Cars" Irvine, CA Apr. 30, 1997, 2 pages.

BenchMarq; Fast–Charge IC, bq2002C, Sep. 1997; pp. 1–9 thru 1–16.

Electronic Products, "Smart External Adapter Meets Many Portable Power Needs" May 1995, 1 page.

Minwa Product Information, MW182, 1993, 1 page.

Smart Adapter Power Converter Schematic, Empire Engineering, Feb. 27, 1995.

Smart Adapter Power Converter Schematic, Empire Engineering, Apr. 27, 1997.

Specification Change Notice, General Dynamics, Oct. 26, 1979.

* cited by examiner

DUAL INPUT AC/DC/ BATTERY OPERATED POWER SUPPLY

CLAIM OF PRIORITY

The present application is a Continuation-in-Part (C-I-P) application of, and claims priority from, commonly assigned U.S. patent application Ser. No. 10/005,961 filed Dec. 3, 2001, which claims the benefit of Provisional application No. 60/335,785 filed Oct. 31, 2001 now abandoned, the teachings of which are incorporated herein by reference.

TECHNICAL FIELD

The present invention generally relates to the field of power converters, and, more particularly, to a portable, dual input AC and DC to programmable DC output power converter.

BACKGROUND OF THE INVENTION

As PC notebooks, PADS, cell phones and the like, continue to grow in popularity, so too does the need for more low cost, compact, power supplies to power these devices. Today, most manufacturers of mobile devices typically include plug-in power adapters along with these mobile devices to help facilitate their customers' power supply needs.

However, there exists a need for a power converter that resolves the system management problems associated with carrying all of the different power supply components necessary to power a wide variety of mobile or portable devices. Moreover, such a power converter would advantageously encompass serving the power supply needs of several different mobile devices by supplying a regulated DC output voltage, responsive to either an external AC or external DC input voltage. Also, such a power converter would have power storing capabilities which allow the power converter to deliver a constant uninterrupted DC output voltage to a user-connected mobile device whenever the external input voltages are momentarily cut off.

SUMMARY OF THE INVENTION

The present invention achieves technical advantages as a power converter delivering a constant, regulated DC output voltage that may be derived distinctly from two separate external input voltages, an AC input voltage or a DC input voltage, and in addition, from a separate, detachable battery pack. The detachable battery pack advantageously allows the power converter to automatically and continuously deliver the regulated DC voltage to the mobile device whenever each external input voltage is unreliable or is temporarily removed. Additionally, the power converter also utilizes a portion of the regulated DC output voltage to conveniently recharge the battery pack during normal operation.

In one embodiment, the present invention is a power converter comprising a power supply circuit and a selectively removable storage circuit. The power supply circuit includes a pair of input filter circuits, each adapted to filter respective AC and DC input voltages provided to the power supply circuit and providing a pair of filtered output voltages. The power supply circuit also comprises a DC-to-DC converter and an AC-to-DC converter, each providing a DC voltage output. The power supply also further comprises a shared DC circuit receiving coupled to the respective DC outputs of the DC-to-DC converter and the AC-to-DC converter. The shared DC circuit provides two regulated DC output voltages, of opposite polarities, at two respective output terminals thereof. The shared DC circuit is also adapted to allow users to selectively program the regulated output voltage, via a programmable key, to conveniently match the voltage and current specifications of their mobile devices.

The detachable battery pack comprises a re-chargeable battery, a battery charger for delivering a charge current to the re-chargeable battery, and a switching circuit comprising a pair of switches and an inverter gate for controlling the charging function of the battery pack. The battery pack is adapted to tap the output terminal of the power supply circuit during normal operation via a common connector plug for recharging. Advantageously, the battery pack can serve as a secondary source of DC input power, in turn, allowing the power supply of the power converter to continuously deliver power to a user-connected device even if each external input voltage is temporarily interrupted or removed.

BRIEF DESCRIPTION OF THE DRAWINGS

Advantages of the invention and the specific embodiments will be understood by those of ordinary skill in the art by reference to the following detailed description of preferred embodiments taken in conjunction with the drawings, in which.

DETAILED DESCRIPTION OF A PREFERRED EMBODIMENT

The invention is a multiple input power converter 10 that can be operated from any one of three mutually exclusive and external input power sources: a DC input, an AC input, or a separate, removable battery pack 14. The power converter 10 can generate and deliver a regulated DC voltage output to variety of user-connected mobile devices, such as, lap top computers, cell phones, or PADS, for example. However, if both of the external AC and DC input voltages are accidentally or intentionally interrupted or removed from converter 10, then the battery pack 14 will serve as a secondary source of input power to power the power converter 12 to deliver an uninterrupted regulated DC voltage. Moreover, the power converter 10 will charge the battery pack 14 with a portion of the same regulated DC output voltage during normal operation so that battery power is available if needed.

Figure 1:
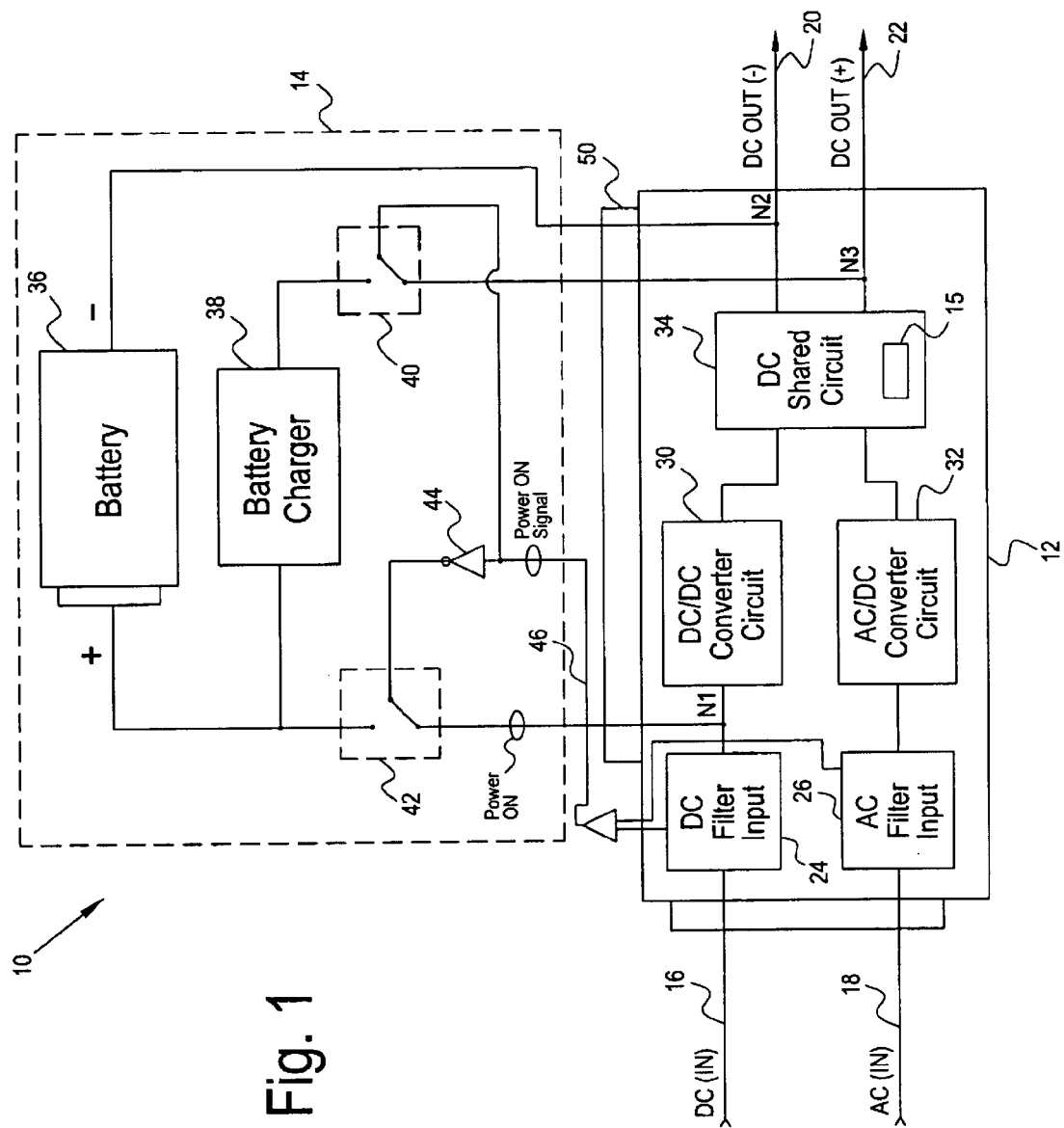
FIG. 1 shows an AC/DC input power converter having a detachable battery pack coupled thereto in accordance with an exemplary embodiment of the present invention.

In FIG. 1 there is shown the dual input AC/DC power converter 10 comprising the power supply 12 with the physically detachable battery pack 14 coupled thereto in accordance with an exemplary embodiment of the present invention. The power supply 12 includes two input terminals 16 and 18 for receiving the external DC input voltage and the AC input voltage, respectively. The DC input voltage is preferably an external DC voltage, namely, derived from a source such as an auto cigarette lighter plug, or an airline EMPOWER DC plug, and, having a voltage ranging between 5VDC and 15VDC. Likewise, the AC input is preferably an external AC voltage derived from a source such as that found in most homes and business environments, ranging between 112VAC and 230VAC. In a preferred embodiment, the power supply 12 delivers two, regulated DC voltages, at output terminal 22, to a user-connected mobile device coupled threat.

In one embodiment, the power supply 12 includes a pair of noise filtering circuits 24 and 26 for filtering each respective input voltage arriving at input terminals 16 and 18. The power supply 12 also includes a DC-to-DC converter circuit 30 which steps up the filtered DC voltage to a voltage of between 15 volts and 24 volts DC and thereafter passes it to a shared DC circuit 34. Similarly, the power supply 12 includes an AC-to-DC converter circuit 32 that converts the filtered AC voltage to a DC signal of between 15 volts and 24 volts. The output of the AC-to-DC converter 32 is also inputted to the shared DC circuit 34. The voltages exiting the shared DC circuit 34, via terminals 20 and 22, comprise a pair of regulated DC output voltages that users may use to power a variety of different user-connected mobile device(s). Moreover, users of the present invention are able to control the magnitude of the regulated DC voltage output, as well as, the current output via a separately detachable programming key 15. For a more detailed description of the shared DC circuit 34 and the programming key 15, cross-reference is made to co-pending U.S. patent application Ser. No. 10/005,961 entitled "A Dual Input AC and DC Power Supply Having A Programmable DC Output", the teachings of which are incorporated herein by reference.

The power converter 10 also comprises the separate, detachable battery pack 14, tapping the power supply 12 at respective nodes N1, N2 and N3 via connector plug 50. The battery pack 14 comprises a re-chargeable battery 36, a battery charger 38, and a switching circuit comprising a first switch 40, a second switch 42, and an inverter gate 44.

The present invention may be configured to operate in one of two different operating modes: first, a direct power mode wherein the power supply 12 generates the regulated DC output voltage by deriving input power from either of the external input voltages provided to respective input terminals 16 and 18; and second, a battery mode, where the power supply 12 provides a similarly regulated DC output voltage which is alternatively derived from the battery 36 of the removable battery pack 14. Preferably, the present invention automatically operates in the battery mode when both of the external input voltages is momentarily interrupted or removed from power supply 12.

In the direct power mode, the physically attached battery pack 14 is electrically connected to the power supply 12 via node N3, which also feeds the output terminal 22. The battery pack 14 includes the first switch 40 and the second switch 42 with the inverter gate 44 coupled therebetween and with each operating initially from a normally open position, as shown. The battery pack 14 also includes the battery charger 38 and the re-chargeable battery 36.

In operation, when either filter circuit 24 or 26 senses a received DC or AC voltage, respectively, it generates a power-on signal on line 46 which is sensed by the inverter gate 44. The power-on signal on line 46 triggers the first switch 40 to close. This same power-on signal 46 is inverted by the inverter gate 44 and received by the second switch 42 causing it to remain in the normally open position. Once the first switch 40 is closed, a portion of the regulated DC output voltage provided at node N3 is passed to the battery charger 38 by switch 40. Once energized, the battery charger 38 passes a charge current to the positive electrode of the re-chargeable battery 36 for charging the same. Moreover, since the second switch 42 remains in the normally open position, switch 42 prevents the re-chargeable battery from feeding a battery voltage to node N1, thereby preventing the power supply 12 from receiving additional DC input power.

Hence, in the direct power mode, the present invention delivers the regulated DC output voltage, to both the mobile device at terminal 22 and to the battery pack 14. Advantageously, users of the present invention are spared the trouble of purchasing a separate battery pack charger to charge the battery pack 14.

In the battery mode, i.e. no input AC or DC power being provided to power supply 12, the battery pack 14 automatically functions as a secondary DC input power source. Here, no power-on signal is asserted on line 46 by the power supply 12. As such, the first switch 40 remains in the normally open position, and inverter gate 44 now triggers the second switch 42 to transition from its normally open position to a closed position. As a result, the second switch 42 electrically couples node N1 of the power supply 12 to the positive terminal of the re-chargeable battery 36. Moreover, when the second switch 42 is closed, the re-chargeable battery 36 feeds a DC voltage of between 5 volts and 24 volts to node N1. This input battery voltage at node N1 feeds the input of the DC-to-DC converter 30, which in turn generates a stepped up DC voltage in response thereto and feeds it to the input of the DC shared circuit 34. The shared DC circuit 34 then generates and delivers two regulated DC voltages of between 5 volts and 24 volts, via output terminals 20 and 22, to the user's mobile devices connected thereto. Thus, the battery pack 14 advantageously serves as an alternate DC input source that continually provides a DC input voltage to the power supply 12 even if each external input voltage at respective terminals 16 and 18 are temporarily suspended or removed.

The power supply 12 automatically reverts back to operating in the direct power mode whenever either external AC or DC input voltage is re-established to terminals 16 and 18. In reverting back to its direct power mode, the power supply 12 will again generate an internal power on signal on line 46 causing the first switch 40 to close, and switch 42 to open, thereby causing the battery charger 38 to charge the re-chargeable battery 36. As previously described this same power-on signal 46 is inverted by the inverter gate 44 such that the second switch 42 in its normally open position. This effectively disconnects the positive terminal of the re-chargeable battery 36 from node N1, thereby, effectively cutting off battery power from being delivered to the power supply 12.

Preferably, the inverter gate 44, which is coupled between switches 40 and 42, ensures that each switch is operating in the opposite state of the other. That is, the inverter gate 44 properly deactivates the battery pack 14 to ensure that the power supply 12 is not receiving input power from all three external power sources, simultaneously.

Figure 2:
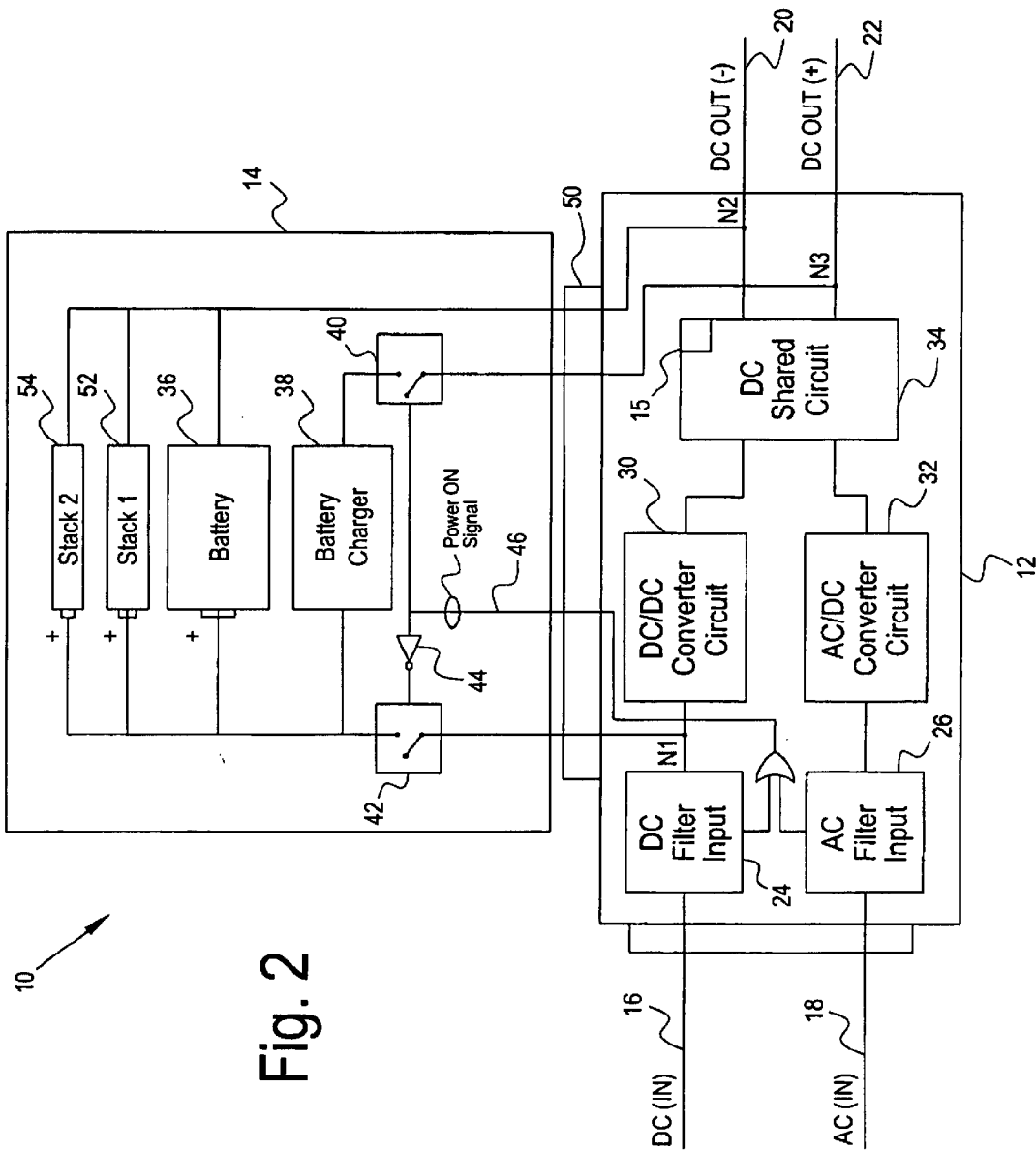
FIG. 2 shows an AC/DC input power converter wherein the detachable back includes multiple stackable recharge able batteries.

In alternative embodiments, the battery charger 38 has characteristics to match both the chemistry of the re-chargeable battery 36 such that the battery pack 14 may be comprised of multiple, stacked re-chargeable batteries 52 and 54. As shown in FIG. 2, these additional re-chargeable batteries may be adapted to advantageously provide the power supply 12 with added power storing capabilities.

The numerous innovative teachings of the present applications will be described with particular reference to the presently preferred exemplary embodiments. However, it should be understood that this class of embodiments provides only a few examples of the many advantageous uses and innovative teachings herein. In general, statements made in the specification of the present application do not necessarily delimit any of the various claimed inventions. Moreover, some statements may apply to some inventive features, but not to others.

What is claimed is:

1. A power converter, comprising:

a power supply circuit providing a regulated DC output voltage and having first and second circuits, said power supply circuit receiving an AC input voltage and a DC input voltage at respective said first and second circuits and providing, in response thereto, a DC output voltage at a first node; and a storage circuit coupled to said power supply circuit, said storage circuit storing a secondary DC input voltage, wherein said storage circuit automatically delivers said secondary DC input voltage to a said power supply circuit only in response to said AC and DC input voltages being temporarily removed to generate the regulated DC output voltage being sufficient to power a portable device.

2. The power converter of claim 1 wherein said storage circuit includes a battery charger and a re-chargeable battery, said battery charger being selectively coupled to the first node of said power supply circuit in response to either said AC input voltage or said DC input voltage being provided to said power supply circuit, charging said re-chargeable battery via a portion said of said regulated DC output voltage.

3. The power converter of claim 1 wherein said storage circuit is selectively countable to, and removable from, said power supply circuit.

4. The power converter of claim 2 wherein said storage circuit further comprises a first switch and a second switch, said battery charger, responsive to said first and second switches charging said re-chargeable battery.

5. The power converter of claim 4 wherein said re-chargeable battery, responsive to said second switch being closed and said first switch being opened by said power supply circuit, providing a DC input voltage to one said circuit.

6. The power converter of claim 5 wherein said storage circuit includes an inverter gate, said inverter gate being coupled to and controlling said first and second switches.

7. The power converter of claim 1 wherein said first circuit comprises a AC-to-DC converter, wherein said AC-to-DC converter is adapted to provide a DC output voltage of between 15VDC and 24VDC.

8. The power converter of claim 7 wherein said second circuit comprises a DC-to-DC boost converter, wherein said DC-to-DC boost converter is adapted to provide a DC output voltage of between 15VDC and 24VDC.

9. The power converter of claim 1 wherein said power supply circuit provides both a first and second regulated DC output voltage.

10. The power converter of claim 1 wherein said storage circuit comprises a battery back having a re-chargeable battery, said power supply circuit providing said regulated DC output voltage in response to receiving a charge voltage from said re-chargeable battery.

11. The power converter of claim 3 wherein said power supply circuit is selectively coupled to said storage circuit at a plurality of different nodes via a common connector.

12. The power converter of claim 1 wherein said power supply circuit is adapted to provide a pair of regulated DC output voltages of between 5VDC and 24VDC.

13. The power converter of claim 1 wherein said power supply circuit is adapted to operate in a direct power mode whenever either said AC and DC input voltages is provided to said first and second circuits and such that the storage circuit is not delivering said secondary DC input voltage to said power supply circuit.

14. The power converter of claim 1 wherein said power supply circuit is adapted to automatically operate in a battery mode from the storage circuit whenever said AC and DC input voltages are not provided to the converter such that the regulated DC output voltage is substantially uninterrupted when the converter transitions from operating from the AC input voltage or the DC input voltage to operating from the storage circuit.

15. The power converter of claim 1 wherein said storage circuit is configured to incorporate a plurality of stacked batteries.

16. A method of operating a power converter powering a portable device, the method comprising the steps of:

generating a DC output voltage responsive to an AC or DC input voltage using a power converter; and automatically delivering a back-up DC input voltage to said power converter only in response to said AC and DC input voltages being removed therefrom and generating said DC output voltage in response thereto being sufficient to power the portable device.

* * * * *